United States Patent [19]
Ewing

[11] Patent Number: 5,217,581
[45] Date of Patent: Jun. 8, 1993

[54] DESALINATION OF SEA WATER NEAR THE CRITICAL PRESSURE

[76] Inventor: Frank A. Ewing, 733 N. Rios Ave., Solana Beach, Calif. 92075

[21] Appl. No.: 925,190

[22] Filed: Aug. 5, 1992

Related U.S. Application Data

[63] Continuation-in-part of Ser. No. 665,906, Mar. 7, 1991, abandoned.

[51] Int. Cl.⁵ ............................................. B01D 3/42
[52] U.S. Cl. ........................................ 203/1; 202/206; 203/3; 203/10; 203/21; 203/DIG. 8; 203/DIG. 17; 203/DIG. 18; 203/DIG. 20
[58] Field of Search ........................ 203/1, 3, 21, 10, 91, 203/DIG. 17, DIG. 20, DIG. 8, DIG. 18; 202/206; 73/304 C

[56] References Cited

U.S. PATENT DOCUMENTS

| | | | |
|---|---|---|---|
| 1,204,716 | 11/1916 | Thorssell | 203/DIG. 17 |
| 2,520,186 | 11/1943 | von Platen | 203/DIG. 17 |
| 3,433,717 | 3/1969 | Loebel | 203/DIG. 17 |
| 3,444,050 | 5/1969 | Sundquist | 203/25 |
| 3,522,152 | 7/1970 | Osdor | 203/11 |
| 3,577,320 | 5/1971 | Randell | 203/1 |
| 3,736,235 | 5/1973 | Sundquist | 202/236 |
| 4,118,285 | 10/1978 | Yeh | 203/81 |
| 4,419,187 | 12/1983 | Cheng et al. | 203/DIG. 17 |
| 4,444,623 | 4/1984 | Youngner | 203/1 |
| 4,975,154 | 12/1990 | Palmer et al. | 203/1 |

FOREIGN PATENT DOCUMENTS

| | | | |
|---|---|---|---|
| 0480505 | 1/1952 | Canada | 202/67 |
| 0466026 | 8/1975 | U.S.S.R. | 203/1 |

*Primary Examiner*—Virginia Manoharan
*Attorney, Agent, or Firm*—Spensley Horn Jubas & Lubitz

[57] ABSTRACT

A distillation system where a saline fluid (10) is pumped into a pressure vessel (14), through a counterflow heat exchanger (16) and heated to boiling. A salt free distillate (20) is separated from the saline fluid (10). The concentrate valve (24) and the distillate valve (26) restrict egress flow. The concentrate valve (24), the distillate valve (26) and the heater (18) are controlled by a computer control system (32) to attain and maintain a desired value of the Ewing Number. The Ewing Number is a dimensionless measure of performance defined as the heat of vaporization of the distillate (20) at standard atmospheric conditions times the distillate (20) mass flow divided by the system power input.

5 Claims, 6 Drawing Sheets

DESALINATION OF SEA WATER NEAR THE CRITICAL PRESSURE

RELATED APPLICATION

This application is a continuation-in-part of U.S. patent application Ser. No. 07/665,906, filed Mar. 7, 1991, now abandoned

BACKGROUND OF THE INVENTION

1. Field of the Invention

This invention relates to getting fresh water from sea water. Sea water is distilled at a pressure near the critical pressure.

2. Description of Related Art

The heat of vaporization of water is one of the major factors in the cost of distilling sea water.

Figure 2:
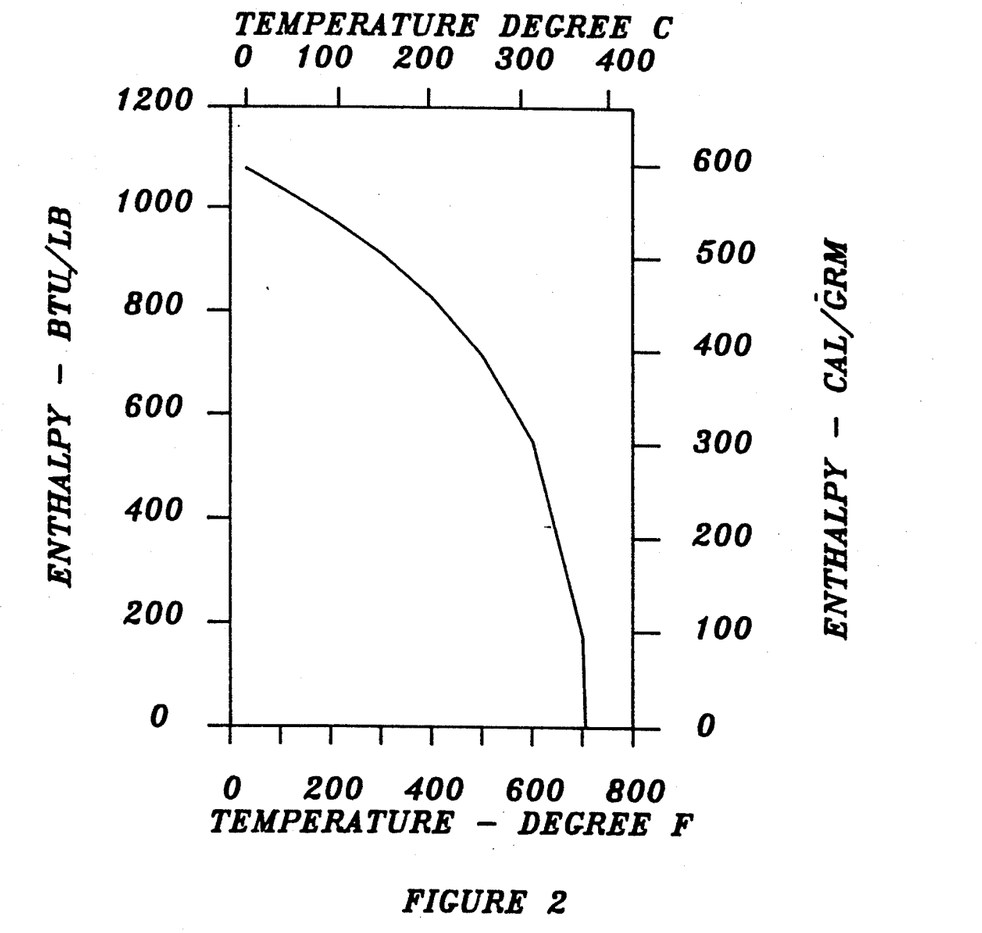
FIG. 2 shows the heat of vaporization of water as a function of temperature.

Heating a liquid toits boiling temperature and supplying the latent heat of vaporization is required for distillation. A heat exchanger for recovery of the heat is required for economic operation. A heat exchanger needs a temperature difference to transfer heat. The outgoing fluid heats the incoming fluid. Heat is transferred until the incoming fluid reaches the temperature of the outgoing fluid. Then no further heat recovery is possible. For example, at atmospheric pressure it takes one cal/grm to heat water one degree Celsius. 80 cal/grm heats water from 20 degrees C. to 100 degrees C. 539 cal/grm converts the water to steam. 80 cal/grm from the outgoing water heats the incoming water to 100 degrees C. The system loses 539 cal/grm. Desalination of sea water at the critical point eliminates the heat of vaporization problem. The critical point is defined as the point beyond which there is no latent heat of vaporization and no other characteristic change which normally marks a change in phase. The critical pressure is the pressure at the critical point. At pressures at and above the critical pressure is the fluid can be heated from a lower temperature to a higher one without any discontinuity in the process. (Joseph H. Keenan, "Thermodynamics," John Wiley & Sons, Inc., 1941). Above the critical point water is always vapor. Keenan also states: "Properties change so rapidly near the critical point that it is difficult to maintain precision in experiment or analysis. In the present state of our knowledge there remain some uncertainties in the data given for saturation states within a few degrees of the critical point." The heat of vaporization approaches zero as the water temperature and pressure approaches the critical point (225.4 kg/cm2 and 374.1 degrees Celsius for pure water). FIG. 2 herein shows the latent heat of vaporization of pure (fresh) water at saturation pressure as a function of temperature. The heat of vaporization is 539 cal/grm at atmospheric temperature and drops at an ever increasing rate until it reaches zero at the critical temperature of 374.1 degrees C. The thermodynamic properties of water are from "Thermodynamic Properties of Steam" by Joseph H. Keenan and Frederick G. Keyes, John Wiley and Sons, Inc., New York, 1936.

The heat of vaporization is a problem only as it affects the cost of water. In 1991, water produced by the Santa Barbara desalination plant cost consumers about $1,900 per acre-foot. That compares with about $260 per acre foot for Colorado River water piped to Southern California and as little as $100 per acre foot for ground water. In 1991, water cost $534 per acre-foot per year in San Diego, Calif.

The Ewing Number (Ew) is a dimensionless measure of the performance of a distillation system. It is the heat of vaporization of the distilled fluid at atmospheric conditions times the mass rate of flow of the distilled fluid divided by the power input to the distillation system. The cost for one acre-foot for one year assuming electricity at $0.10/kw-hr is 77,000/Ew. On this basis, the following table shows the cost of distillation:

| Condition | Ew | Cost $/acre-ft/yr |
|---|---|---|
| Atmospheric pressure without recovery | .77 | 100,000 |
| Atmospheric pressure with recovery | 1.00 | 77,000 |
| Operate at 28.1 kg/cm2 with recovery | 1.24 | 62,000 |
| Operate at 168.7 kg/cm2 with recovery | 2.51 | 31,000 |
| Operate at 225.0 kg/cm2 with recovery | 16.0 | 4,800 |
| Operate at 225.4 kg/cm2* with recovery | 244.0 | 320 |

*assumed critical pressure
The average family uses one-half acre-foot of water per year.

Commercial operation at the high pressure (225.4 kg/cm2) and high temperature (374.1 degrees Celsius) of the critical point is not a problem. In the early 1950's the first commercial supercritical-pressure steam turbine was developed. This commercial unit successfully operated at an inlet pressure of 316 kg/cm2 and an inlet temperature of 621 degrees Celsius. The flow for this unit was roughly equivalent to the water requirements of 4,000 families. The successful commercial operation of this unit shows that high flows, pressures and temperatures are not barriers to commercial conversion of sea water.

U.S. Pat. No. 1,904,716 to Thorssell (1916) recognizes that the heat of vaporization of water is one of the major factors in the cost of distilling sea water to get fresh water.

Thorssell states ". . . at the pressure and temperature corresponding to or near the critical point of the liquid . . . " There is no explanation of what this is or how it is determined.

Thorssell depends on the Joule-Thomson effect to condense the steam. He predicts a positive Joule-Thomson coefficient by extrapolation. FIG. 9 of Keenan and Keyes shows that the Joule-Thomson coefficient is zero at the critical point. The coefficient is positive for steam (vapor) and negative for water (liquid). The Joule-Thomson effect will not condense the steam at the critical point.

Figure 5:
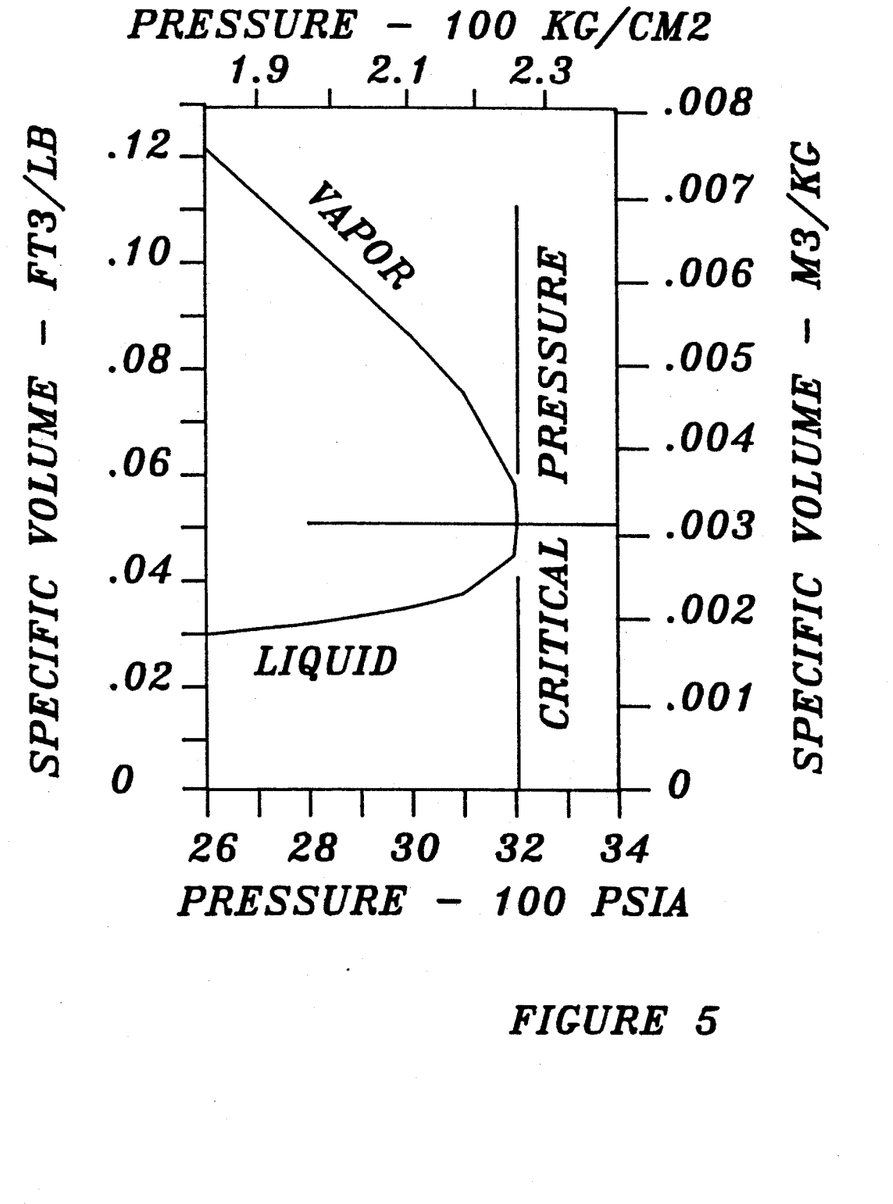
FIG. 5 shows the specific volume of saturated water liquid and vapor at pressures from 180 kg/cm2 to 225.4 kg/cm2.

U.S. Pat. No. 2,520,186 to von Platen (1950) purports to take advantage of the zero heat of vaporization above the critical point by operating above the critical point. Von Platen claims that fresh water is obtained. Above the critical point there is no phase change to separate the salt free distillate from the salt laden concentrate. FIG. 5 herein shows the specific volume of saturated water and steam near the critical point.

Figure 3:
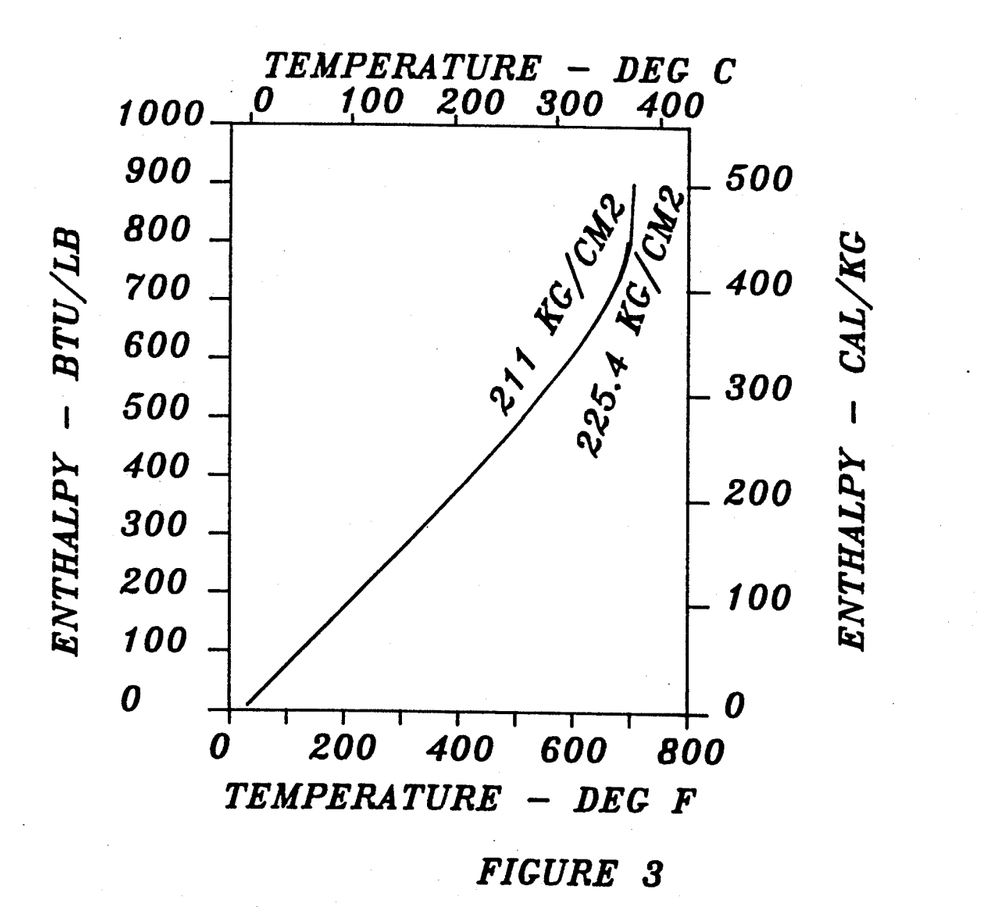
FIG. 3 shows the enthalpy of water as a function of temperature at pressures of 211 kg/cm2 and 225.4 kg/cm2.
Figure 4:
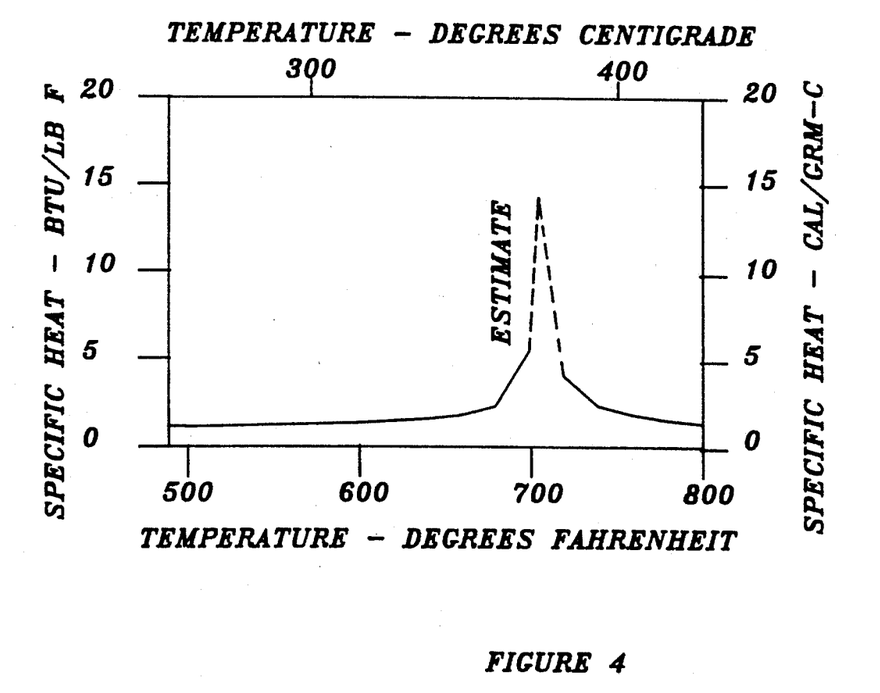
FIG. 4 shows the specific heat of water at a pressure of 225.4 kg/cm2.
Figure 6:
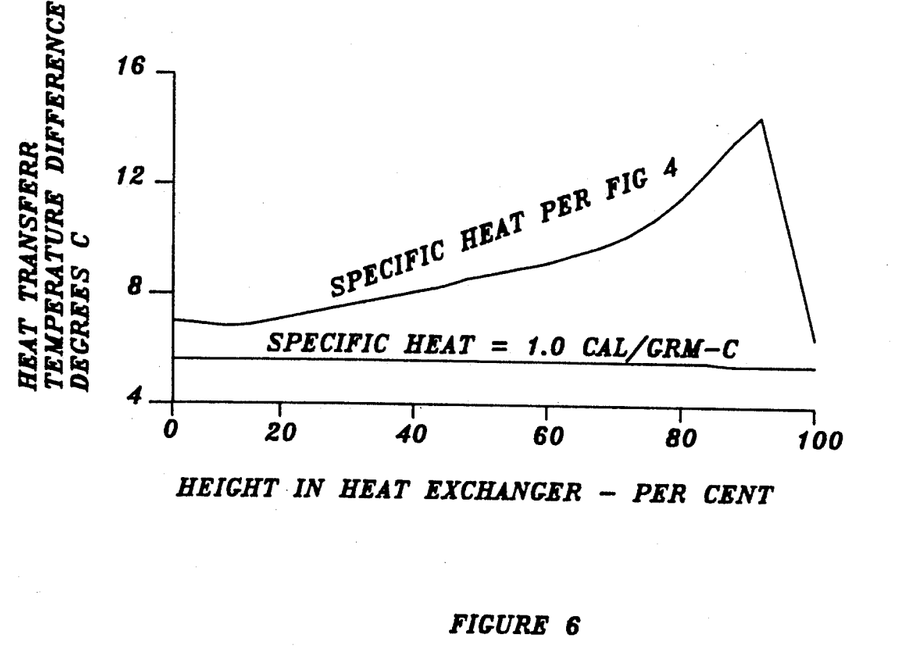
FIG. 6 shows a comparison in performance between a heat exchanger where the fluid specific heat is a constant value of unity and a heat exchanger where the fluid specific heat varies as shown in FIG. 4.

U.S. Pat. No. 3,522,152 to Osdor (1970) notes that the high cost of sea water conversion remains and attributes this to the "squeeze" problem. The "squeeze" problem arises due to the variation of the specific heat of water, particularly near the critical point. FIG. 3 herein shows the enthalpy of pure water at 211 Kg/Cm2 and at 225.4 Kg/Cm2. The enthalpy increases at an increasing rate as the temperature approaches the critical temperature. This increasing rate is more clearly shown on FIG. 4 herein where the specific heat of water near the critical pressure is plotted versus temperature. A constant heat input will result in an ever decreasing rise in temperature below the critical point. Above the critical point, the reverse is true. A constant heat input will result in an ever increasing rise in temperature. The critical point is an unstable point. A thermal finite element computer model of counter flow heat exchangers for a constant unity specific heat and for a specific heat which varied as shown in FIG. 4 indicating the degradation in performance caused by the increase in specific heat. FIG. 6 herein shows the temperature difference between the incoming fluid and the outgoing fluid. The increase in specific heat near the critical point has a marked but finite effect. The ineffectiveness of the heat exchanger is the difference in total heat entering the heat exchanger and the total heat leaving the heat exchanger. A zero temperature difference between inlet and outlet flow is zero ineffectiveness and unobtainable. The model shows that unity specific heat results in a temperature difference of 5 degrees Celsius. The specific heat variation shown on FIG. 4 results in a temperature difference of 7 degrees Celsius. This is a change in loss of heat from 5 cal/grm to 7 cal/grm due to the peculiar specific heat property. The heat exchanger ineffectiveness is increased 40%, a serious but not fatal problem.

Osdor goes on to propose a complicated scheme to overcome the squeeze problem. Osdor proposes to operate ". . . in the vicinity of the critical pressure of substantially pure water." There is no explanation as to what the vicinity of the critical pressure is or how it is determined.

The following prior art does not take advantage of the reduction of the heat of evaporation at the critical point.

Russian patent 466,026 discloses "The correction unit provides information based on level sensor signals, which adjust steam flow rate to the heater." The inventor does not consider recovering the heat of vaporization.

U.S. Pat. No. 4,444,623 to Younger (1984) discloses a distillation process. The inventor does not consider recovering the heat of vaporization.

U.S. Pat. No. 3,433,717 to Loebel (1969) discloses a distillation process wherein some of the distillate and concentrate energy is transferred to the incoming sea water. The inventor does not consider recovering the heat of vaporization.

Canadian patent 480,505 to Rivera (1952) relates to method and apparatus for determining the purity of steam. A condensed sample of the steam is measured for conductivity. The inventor does not consider recovering the heat of vaporization.

U.S. Pat. No. 4,419,187 to Cheng, et al (1983) discloses a liquid-vapor interface in a thermal membrane distillation method. The inventor does not consider recovering the heat of vaporization.

U.S. Pat. No. 3,444,050 to Sundquist (1969) purports to distill sea water taking advantage of a "natural refrigerating phenomena." The pressure is "maintained within a limited range, just above atmospheric pressure." The inventor states "Curve separation in the temperature stratification column sets into motion a natural refrigeration effect. This effect is experienced when the fingers are quickly touched to the metal bottom of a pot of boiling liquid. While boiling continues, the bottom is felt to be cold. The significance of this phenomenon is that a heat flux is set up in a heated turbulent liquid. The heat flux is directed upward in opposition to the pull of gravity." For practical purposes heat flux is not affected by gravity. While the inventor may have felt cold, the metal bottom of the pot must have been hot, given the stated conditions.

Sundquist's FIG. 3 gives an equation which equates vaporization rate to a product of area, temperature to the 7/3 power, and the reciprocal of heat per unit mass. This is dimensionally inconsistent and cannot be a valid relationship.

Sundquist's FIG. 4 gives an equation for mass flow rate of vapor which if evaluated with any reasonable selection of values results in a prediction of negative mass flow rate of vapor. A positive input of sea water is predicted to result in a loss of distillate. This prediction casts doubt on the validity of the equation.

U.S. Pat. No. 3,736,235 to Sundquist (1973) purports to reduce the overhead clearance requirements by only pressurizing the heated hot distillate to prevent vapor formation. No change of the vapor pressure was proposed. The inventor does not consider recovering the heat of vaporization.

None of these patents has resulted in a practical, economical method of desalination. Only the first three propose to reduce the energy requirements by taking advantage of the reduced heat of vaporization near the critical point. They do not disclose a method for determining the actual pressure or condition of operation. This leaves a question as to how to determine the optimum operating temperature and pressure. There is also a question as to how to attain and maintain this optimum.

OBJECTS AND ADVANTAGES

Several objects of my invention are:

(a) to get cheap fresh water from sea water,
(b) to control the process of conversion without ambiguity,
(c) control the process without knowledge of the required pressure or temperature of the fluid.
(d) control the process without knowledge of the actual pressure or temperature.

The advantage of my invention is that optimum temperature and pressure need not be determined. Power input and fresh water flow are controlled. Power and flow have a broader tolerance than temperature and pressure and are more directly related to the intended results. For example, a 10% change in fresh water flow results in a 10% change in operating cost. A 0.2% change in pressure results in a 1,500% change in operating cost at the critical point.

The use of the term sea water and fresh water shall not limit this use. The term sea water shall apply to any substance where separation by distillation is practical. Still further objects and advantages will become apparent from a consideration of the following description and drawings.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than limitations on the present invention.

Figure 1:
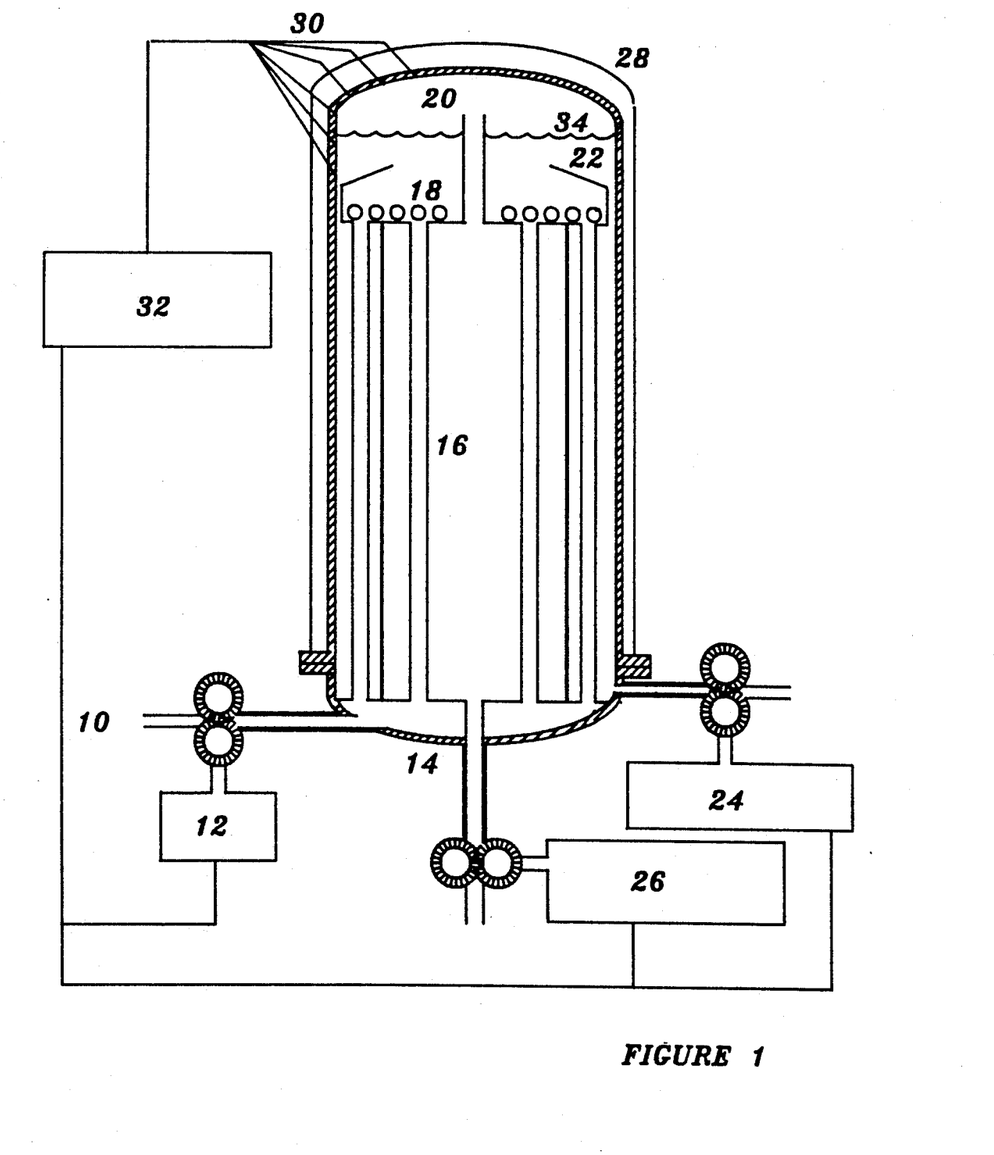
FIG. 1 shows various aspects of the desalination apparatus.

A system for the desalination of a saline solution is shown on FIG. 1.

The saline fluid 10 is any fluid capable of being refined by distillation. The saline fluid 10 may be sea water.

The pump 12, which in the preferred embodiment of the present invention may be motor driven, can transfer a saline fluid 10 from atmospheric conditions to the critical pressure. The pump 12 includes devices for controlling the pump 12 and sending the pump 12 state to a computer control system 32.

The pressure vessel 14 can contain a fluid up to the critical temperature and pressure of the fluid. It contains the saline fluid 10, the counterflow heat exchanger 16, the heater 18, the distillate 20, the concentrate 22, and the interface detectors 30. It may be one or more vessels. The pressure vessel 14 provides a space for separation of the distillate 20 and concentrate 22. It provides means for channeling the distillate 20 to the distillate valve 26 and the concentrate 22 to the concentrate valve 24.

The counterflow heat exchanger 16 can contain the entering saline fluid 10, the exiting distillate 20 and concentrate 22. It can transfer heat from the exiting distillate 20 and concentrate 22 to the incoming saline fluid 10. It can channel the distillate 20 and concentrate 22. The use of the word counterflow does not limit the configuration to that of a classic "counterflow heat exchanger" and includes all arrangements of flow passages. The counterflow heat exchanger 16 may function as a condenser.

The heater 18 can supply more heat than the heat loss of the system. It can send the heater 18 state to the computer control system 32. It can change state in response to the computer control system 32 signals. The heater 10 can be a boiler with reheaters. It may heat indirectly or by direct injection of steam.

The distillate 20 is the salt free product of boiling the saline fluid 10.

The concentrate 22 is the remaining fluid after the distillate 20 is separated from the saline fluid 10. The preferred embodiment of the present invention is designed to convert 50% of the incoming saline fluid 10 (for example sea water) into fresh water.

The concentrate valve 24 can restrict the egress of the concentrate 22 up to the critical pressure. It can send its state to the computer control system 32. It can be controlled by the computer control system 32. The concentrate valve 24 may include inlet and outlet piping. It may have forms not normally associated with valves. For example, the concentrate valve 24 may be a hydraulic motor and generator set or a fixed orifice. Alternatively, the concentrate valve 24 may include a hydraulic motor and generator set or a turbine and generator set, whereby the energy of the high pressure fluid is used to co-generate electricity, in known fashion. The control may be manual, hydraulic, pneumatic, electrical or mechanical. The signal may be human, electrical, fluid, or mechanical.

The distillate valve 26 has the same capabilities as the concentrate valve 24 except restricts the egress of the distillate 20, and may take any of the forms suggested for the concentrate valve 24.

Insulation 28 provides a heat barrier between the pressure vessel 14 and the atmosphere.

The interface detectors 30 can sense the level of the interface 34 between the distillate 20 and concentrate 22. It transmits level data to the computer control system 32. It may be mechanical, electric, ultrasonic, or human. It may detect discrete (digital) or continuous (analog) levels. The interface detectors 30 may take advantage of the conductivity of a seawater and the non-conductivity of pure water. The interface detectors 30 may be a vertical array of saline probes. In the preferred embodiment of the present invention, such saline probes may be wall mounted.

The computer control system 32 is human, mechanical, electronic, or a combination. It stores initial and desired values. It can accept data from other devices. It can process data and decide action to be taken. It can interpret data such as opening, speed, power, voltage, current flow, pressure, temperature, displacement, time, flow and conductivity. In one embodiment of the present invention, with sea water supplied to the system the computer allows the concentrate motor to rotate freely and stops rotation of the fresh water motor. After the system heats up, steam begins to form and collect at the top of the pressure vessel. The computer notes the salinity probe readings and adjusts the two motor speeds hence the relative flow of fresh water and concentrate such that the salinity interface line between the steam and salt water remains steady at the design level. The flow through a motor is a function of the motor speed. Throughout the operation of this apparatus the computer is programmed to maintain the salinity interface line steady at the design value. The computer has available, at all times, an extremely sensitive measure of the flows into and out of the system. It may be seen that at the initial condition of atmospheric pressure that the fresh water flow could be expected to be about 1% of the inlet flow. The design object is to increase this to some value such as 50%.

Now the program increases the load on the motors thus restricting flow and increasing the pressure in the pressure vessel. When the pressure in the pressure vessel is approximately 225 kg/cm2 the maximum temperature rises to 374 degrees. Note that the system does not depend on pressure values, the values are only given to relate to the best estimated properties of water. At 225 kg/cm2 the latent heat of vaporization is about 30 cal/grm so the performance of the unit is increased from 1% of the design sea water flow to 5/30*100 or 16% of the design sea water flow for the same 5 cal/grm heat input. At this point the fresh water flow is approximately 16% of the inlet flow. The pressure is 0.4 kg/cm2 below the critical pressure. Assuming a linear relationship between pressure and heat of vaporization, it may be seen that a pressure just 0.07 kg/cm2 below the critical pressure would be required to reduce the heat of vaporization to 5 cal/grm. For the process to be controlled by pressure measurement alone would require that the pressure be measured and the critical pressure be known within a total error of 0.01%. The thermodynamic property data near the critical point for pure water is uncertain. Similar data for sea water in all its various concentrations and compositions is lacking. Further, the critical point is unstable. Just below the critical point it takes an ever increasing amount of heat to raise the water temperature. Above the critical point it takes an ever decreasing amount of heat to increase the water temperature. Should the critical point inadvertently be exceeded, suddenly all of the fluid will turn to "stuff" with no latent heat of vaporization nor a density difference to be utilized in separating saline water from fresh water.

The program continues to decrease the speeds of both motors by a design value and notes if the saturation line rises, falls or stays the same. If the saturation line falls, the program increases the fresh water motor speed and decreases the concentrate motor speed. If the saturation line stays the same and the fresh water motor speed does not exceed a specified maximum, the program repeats the decrease in speeds of both motors by a design value. If the saturation line stays the same and the fresh water motor speed equals or exceeds a specified maximum (in the example a speed that indicates that the fresh water flow is half of the incoming sea water flow) the program maintains the current speeds. If the saturation line rises, the program increases the speed of both motors by the design value, reduces the design value by half and repeats the decrease in both motors by the new lower design value. In other words, the program makes a binary search to determine the desired conditions.

This process is repeated during the operation of the unit.

The variability of the specific heat versus temperature is shown on FIG. 4. The increase in value as the critical point is approached from a lower temperature aids in approaching the critical point cautiously. A constant heat input will result in an ever decreasing rise in temperature, providing the critical pressure is not exceeded. The degradation in performance, caused by the increase in specific heat, was investigated. A thermal finite element computer model of a counter flow heat exchanger was prepared. The model was run for a constant specific heat and for a specific heat which varied as shown on FIG. 4. FIG. 6 shows the temperature difference between the incoming sea water and the outgoing fresh water and concentrate. The increase in specific heat at the upper end has a marked but finite effect. The effectiveness of the heat exchanger is the difference in sea water temperature entering the heat exchanger and the temperature of the fresh water and concentrate leaving the heat exchanger. A zero temperature difference is 100% effectiveness and unobtainable. The model shows that the specific heat variation results in a temperature change of from 5 to 7 degrees Centigrade or a change in loss of heat from 5 cal/grm to 7 cal/grm due to the peculiar specific heat property. The results indicate that the variability of specific heat properties will not be a major problem.

In an alternative embodiment of the present invention, the computer system returns control signals to the other devices. It can determine the power applied to the system, the mass flow rate of distillate 20, and the interface 34 level. It calculates the Ewing Number and determines appropriate action. The Ewing Number is the heat of vaporization of the distillate 20 at standard atmospheric conditions (i.e., one atmospheric pressure at 20° C.) times the mass rate of flow of the distillate 20 divided by the power input to the desalination system. The desired value of the Ewing Number is determined from prior development tests of the particular system. It is the largest value practicable. It is largely dependent on the accuracy of the computer control system 32, the ineffectiveness of the counterflow heat exchanger 16, and the effectiveness of the insulation 28.

The interface 34 is the surface between the concentrate 22 and distillate 20.

At start-up, the computer control system 32 sets initial values. It fully opens the concentrate valve 24, closes the distillate valve 26, starts the pump 12, and turns on the heater 18. The temperature of the saline fluid 10 rises until the saline fluid 10 begins to boil.

The computer control system 32 may follow any number of logic systems. One such logic system follows. The computer control system 32 starting at the point VARY makes small predetermined steps in the restriction of the distillate valve 26 or the concentrate valve 24. The location of the interface 34 is noted before and after each step. If the location of the interface 34 moves away from the desired level of interface 34, the sign of the step is changed. The selected valve is moved to its former restriction. The computer control system 32 explores alternate moves of the distillate valve 26 and concentrate valve 24 until the interface 34 level is within predetermined acceptable levels. The computer control system 32 then goes to the point ADJUST.

At the point ADJUST, if the Ewing Number is greater than the desired maximum value of the Ewing Number the computer control system 32 goes to the point VARY. If the Ewing Number is less than or equal the desired maximum value, the computer control system 32 makes a predetermined step to either the distillate valve 26, the concentrate valve 24, or the heater 18. The device selected is the device following the last device selected for stepping. The Ewing Number is calculated. If the Ewing Number is equal to or greater than its previous value, the computer control system 32 goes to VARY. If the Ewing Number is less than its previous value, the computer control system 32 changes the sign of the step and reverts the device to its state prior to the step and goes to VARY. This continues while operating the desalination system. The following segment of a PL/1 program shows the above logic:

```
DESAL:procedure;        /* COMMENTS                          */
STARTUP:                /* labels in caps                    */
device(1) = 1000;       /* fully open distillate valve 22    */
device(2) = 0;          /* fully close distillate valve 20   */
device(4) = 1;          /* turn on pump 12                   */
device(3) = 1000;       /* power heater 18 to full power     */
step(1) = −1;           /* set change for device(1)          */
step(2) = −1;           /* set change for device(2)          */
step(3) = −1;           /* set change for device(1)          */
step(4) = −1;           /* set change for device(2)          */
step(5) = −1;           /* set change for device(3)          */
i = 0; j = 0;           /* set initial values                */
error = 1000;           /* error = abs(level − desired)      */
allow_error = 5;        /* set desired value                 */
desired_Ew = 244;       /* set target Ewing Number           */
Ew = 0;                 /* set Ewing Number initial value    */
VARY:                   /* loop for controlling level        */
if error < allow_error then go to ADJUST;
error_last = error;
i = i + 1;
i = mod(i,2) + 1;
device(i) = device(i) + step(i);
    if error > error_last then do;
        step(i) = −step(i);
        device(i) = device(i) + step(i);
```

```
            end:
go to VARY;
ADJUST:            /* loop for optimizing performance */
if Ew > desired_Ew then go to VARY;
Ew_last = Ew;
j = j + 1;
j = mod(j,3) + 3;
device(j−2) = device(j−2) + step(j);
Ew = heat_of_vaporization * flow / energy_input;
if Ew > = Ew_last then go to VARY;
     else do;
        step(j) = −step(j);
        device(j−2) = device(j−2) + step(j);
        go to VARY;
        end;
end DESAL;
```

Additional features may be added such as limits to the heat input, limits to the ratio of distillate 20 flow to concentrate 22 flow, time delays, making the steps a function of the error and other practical considerations.

The interface 34 level, the Ewing Number, the distillate 20 flow and power input each may be controlled by one or more of the pump 12, heater 18, concentrate valve 24 or distillate valve 26 that can produce the intended results.

Thus the cost of sea water conversion can be cheap by taking advantage of the peculiar properties of water and by controlling the process by logic similar to the above logic. The heat exchanger area can be determined such that the temperature difference between the incoming sea water and the outgoing fresh water and concentrate is an appropriate value for a balance between capital investment and operating cost consistent with the intended use of the unit.

While my above description contains many specificities, these should not be construed as limitations to the scope of the invention, but rather as an exemplification of one preferred embodiment thereof. Many other variations are possible. For example, the fresh water and concentrate motors could be replaced with control valves with the resulting loss of recovery of some of the energy used in pressurizing the water. The heater can be electrical, steam or any number of other methods. The heat may be added indirectly or by direct introduction of steam. The pump and motors could be any number of state of the art types. The motors could be turbines and the heat exchanger could be a boiler. The interface detectors could be salinity detectors, hydrometers, optical meniscus detectors, sonic or radar, conductivity meters, or any device that is capable of detecting the interface. Accordingly, it is to be understood that the invention is not to be limited by the specific illustrated embodiment, but only by the scope of the appended claims.

I claim:

1. A distillation process for operation at approximately a critical point, comprising the steps of:
   (a) introducing saline fluid by means of a pump into an insulated pressure vessel including a counterflow heat exchanger, a concentrate valve, and distillate valve;
   (b) heating at least some of the saline fluid by means of a heater;
   (c) measuring an interface of a distillate and a concentrate by means of at least one interface detector controlled pump, the heater, the concentrate valve, the distillate valve, and a computer control system, whereby the distillate flows to the distillate valve and the concentrate flows to the concentrate valve; and;
   (d) restricting egress of the concentrate with the concentrate valve;
   (e) restricting egress of the distillate with the distillate valve; and
   (f) measuring performance of the distillation process by an Ewing number defined by the heat of vaporization of the distillate at atmospheric conditions multiplied by the mass rate of flow of the distillate divided by the power input to a distillation system; and
   (g) controlling one or more of the heater, the pump the distillate valve, and the concentrate valve, such that the interface attains and maintains a desired level and the Ewing number attains and maintains a desired value.

2. The distillation process of claim 1, further comprising the step of attaining and maintaining a desired flow of the distillate and desired heat input in the distillation process by controlling one or more of the pump, the heater, the concentrate valve, and the distillate valve.

3. The distillation process of claim 1, wherein the saline fluid is sea water.

4. The distillation process of claim 1, wherein energy input by the pump is at least partially recovered.

5. The distillation process of claim 1, wherein the interface is detected by a vertical array of saline probes.

* * * * *

UNITED STATES PATENT AND TRADEMARK OFFICE
CERTIFICATE OF CORRECTION

PATENT NO. : 5,217,581
DATED : June 8, 1993
INVENTOR(S) : Frank A. Ewing

It is certified that error appears in the above-indentified patent and that said Letters Patent is hereby corrected as shown below:

Please delete "controlled pump, the heater, the concentrate valve, the distillate valve, and a computer control system, whereby the distillate flows to the distillate valve and the concentrate flows to the concentrate valve; and" from column 10, lines 17-21.

Signed and Sealed this

Thirteenth Day of December, 1994

*Attest:*

BRUCE LEHMAN

*Attesting Officer*     *Commissioner of Patents and Trademarks*